May 5, 1970  B. DEGAETANO  3,509,658
TOY TELEPHONE
Filed Aug. 13, 1968
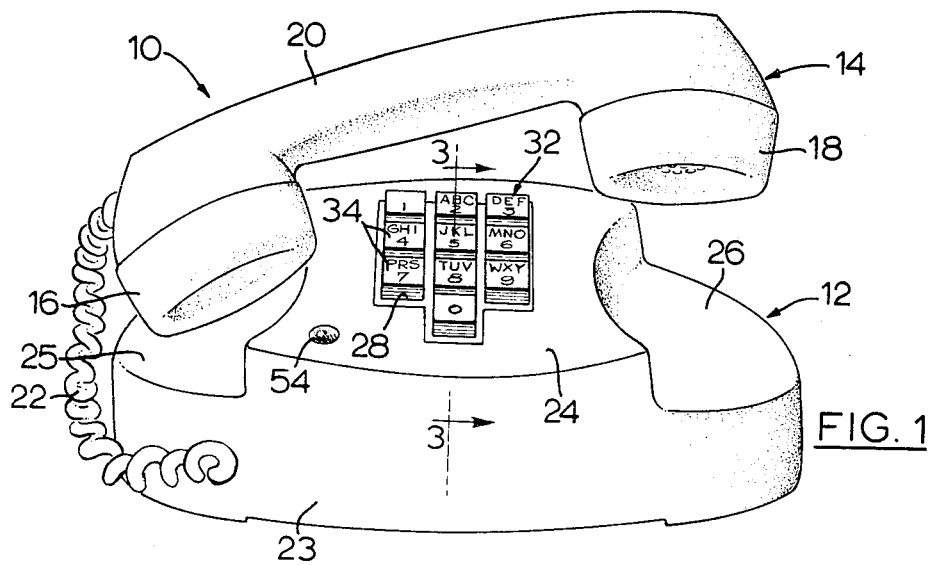
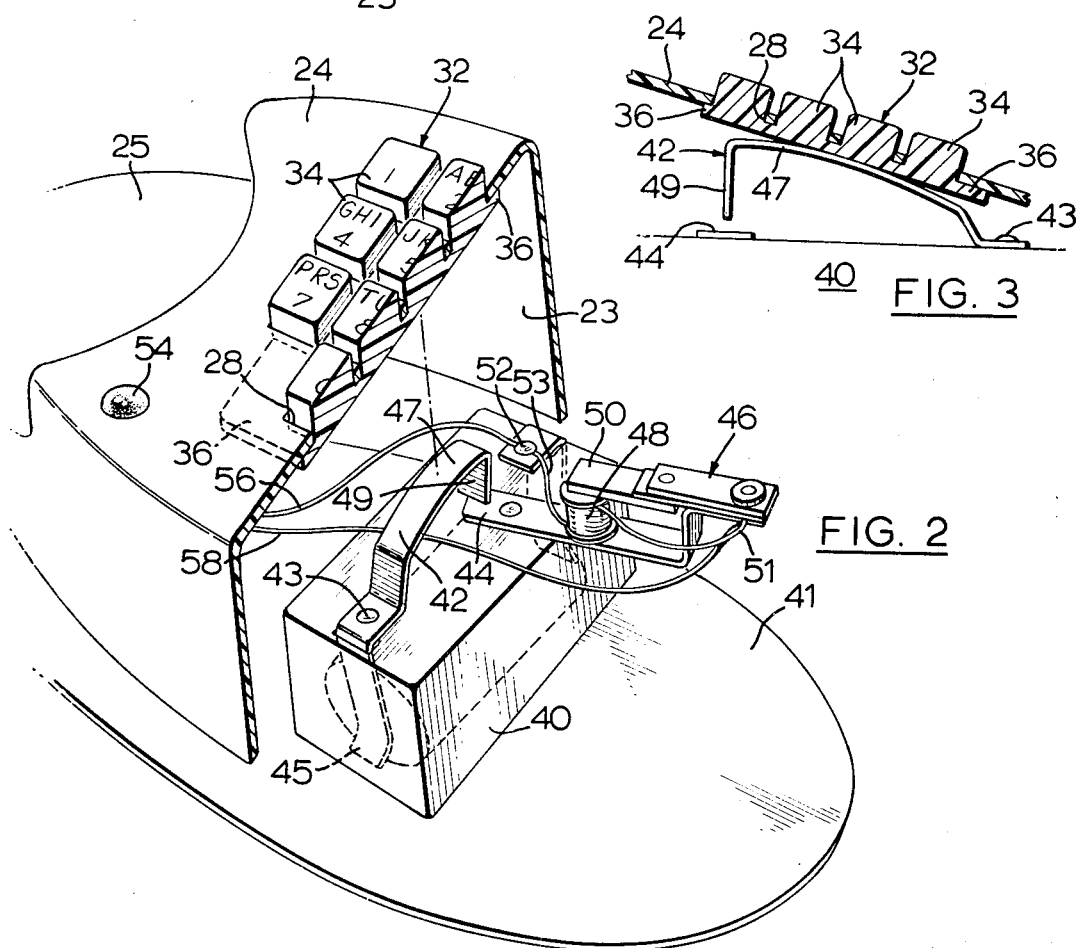
INVENTOR.
BEN DEGAETANO
BY
Attorney United States Patent Office 3,509,658
Patented May 5, 1970

3,509,658
TOY TELEPHONE
Ben Degaetano, Armonk, N.Y., assignor to Continental Research & Development Ltd., Toronto, Ontario, Canada, a company of Canada
Filed Aug. 13, 1968, Ser. No. 752,235
Int. Cl. A63h 33/30
U.S. Cl. 46—33                      8 Claims

ABSTRACT OF THE DISCLOSURE

A toy telephone cradle having simulated push-buttons in combination with a switch assembly for operating an electric buzzer and light circuit.

Background of the invention

This invention relates to children's toys and is particularly directed to a sound producing toy telephone.

Toy telephones are known which have a dial in the form of a disc rotatably mounted on the telephone cradle. The disc is spring biased to return it to a predetermined position when rotated, and as it rotates, a bell sounds due to the mechanical actuation by the disc. Such toy telephones are, however, composed of a relatively large number of mechanical parts and require a number of operational steps in their assembly. Accordingly, such telephones are relatively costly to produce. Moreover, such telephones are highly susceptible to breakage.

It is therefore an object of the present invention to provide a low cost and rugged sound producing toy telephone which can be manufactured simply and inexpensively with a relatively small number of manufacturing and assembly operational steps.

It is another object to provide a toy telephone having a sound producing mechanism which may be readily actuated from an exposed surface of the telephone cradle by simulated push-buttons.

And another object is the provision of a toy telephone which is realistic in appearance and can utilize illuminating means in combination with sound producing means energized by an electric battery.

Summary of the invention

These and other objects may be achieved by providing a toy telephone having a cradle comprising a casing having a face, said face having a plurality of apertures formed therein, a member simulating push-buttons consisting of a planar body having a plurality of spaced-apart protrusions formed integral on one side thereof positioned below said face within the casing, said apertures corresponding to said protrusions such that said protrusions can project freely through said apertures, electrical contact means mounted within the casing for biasing said simulated push-button member against the underside of said face, and an electrical circuit to be energized by a battery having signalling means incorporated therein in series with said electrical contact means such that depression of any of said protrusions closes said electrical contact means for energizing said signalling means and release of said protrusion opens said electrical contact means for de-energizing said signalling means.

Brief description of the drawing

A fuller understanding of the invention may be had by referring to the following description and claims, taken in conjunction with the accompanying drawing, in which:

FIG. 1 is a perspective view of the toy telephone according to the present invention showing the hand set and the cradle;

FIG. 2 is an exploded perspective view of the cradle of the toy telephone shown cut away to expose the sound producing mechanism; and FIG. 3 is a section taken along line 3—3 of FIG. 1.

Like reference characters refer to like parts throughout the description of the drawing.

Description of the preferred embodiment

With reference to FIG. 1, the toy telephone indicated generally by the numeral 10 consists of cradle 12 and transmitter-receiver hand set 14 each of a shape similar to the corresponding components of a normal telephone. Hand set 14 has a simulated voice transmitting element 16 and a simulated voice receiving element 18 spaced apart by a handle 20. The hand set 14 is connected to cradle 12 by helical cord 22.

Cradle 12 comprises a casing 23 generally elliptical in plan having an inclined face 24 and a pair of indentations 25 and 26 formed at opposite ends thereof adapted to receive and support hand set 14 when not held in a child's hand. A plurality of apertures 28 is centrally located on face 24 spaced apart from and between indentations 25 and 26 for receiving member 32 which simulates a set of push-buttons. Member 32 has a plurality of spaced apart rectangular protrusions 34 formed integral on one side thereof and is adapted to be secured against the undersurface of face 24 of casing 23. Apertures 28 are so arranged that protrusions 34 project therethrough and may be touched by a user of the telephone. As shown, each protrusion 34 displays a different identifying mark characteristic of the indicia formed on push-buttons of a telephone.

With particular reference now to FIG. 2 and 3, battery housing 40 formed integral with planar base member 41 which forms the underside of cradle 12 is adapted to receive a 1.5 volt dry cell electric battery, shown by ghost lines. Contact arm 42, pivotally mounted to housing 40 by rivet 43, has a downward terminal extension 45 within said housing for electrical contact with one end of the battery therein. The opposite end of arm 42 has an arcuate extension 47, shown most clearly in FIG. 3, adapted to abut the underside of member 32 to normally bias edge extensions 36 thereof against the undersurface of face 24.

Arm extension 47 is adapted to be depressed such that free end 49 makes contact with mounting strip 44 riveted as shown onto housing 40. Strip 44 supports a conventional buzzer 46 consisting of an electromagnet having a winding and core assembly designated by numeral 48 and a vibrator 50 arranged such that current flow from the battery through arm 42 to strip 44 is communicated by lead 51 to coil 48 and from coil 48 to battery terminal 52 by lead 53.

A light 54 may be incorporated in the structure and circuit by a pair of leads 56, 58 shown in FIG. 2.

In operation, the child using the telephone lifts the hand set 14 to expose the simulated push-buttons on the cradle and depresses one of the protrusions 34 to force free end 49 of arm 42 into contact with mounting strip 44 such that current flows from the battery in housing 40 through terminal 45 of arm 42, through strip 44, lead 51 to winding 48, and lead 53 to terminal 52 and the opposite end of the battery. Energization of coil 48 causes vibrator 50 to strike the core of the electromagnet thereby short-circuiting current flow to lead 53 and by-passing winding 48 to de-energize the electromagnet and release vibrator 50. Immediately upon release of vibrator 50 from the electromagnet core, the winding is re-energized attracting vibrator 50 thereto for the rapid repeat of the cycle to provide a buzzing sound.

It will be evident that light 54 will be energized while 42 is in electrical contact with strip 44 independent of the operation of buzzer 46 since the light circuit is connected in parallel to the buzzer circuit.

An important feature of the structure of the present invention is the operation of the simulated push-buttons. If the button bearing the indicia "0" is depressed, for example, member 32 is pivoted about upper edge 36 to depress arm 42 for engagement of free end 49 thereof with strip 44. If buttons marked with indica "1," "4" or "7" on the left side as shown in FIGURE 1, or buttons marked with indicia "3," "6," "9" on the right side as shown in FIGURE 1, are depressed, member 32 pivots about the opposite edge to depress arm 42 into engagement with strip 44. Likewise, depression of push-buttons marked with indicia "1," "2" or "3" will pivot member 32 about the lower edge 36 for depression of arm 42. Depression of the central push-buttons results in pivotal movement of member 32 about the lower edge 36.

The toy telephone preferably is manufactured of a tough and rigid plastic having the characteristics of polypropylene, polyethylene or the like with the simulated push-buttons of a colour contrasting to the colour of the hand set and the base.

What I claim as new and desire to protect by Letters Patent of the United States is:

1. A toy telephone cradle comprising a casing having a face, said face having a plurality of apertures formed therein, a member simulating push-buttons consisting of a planar body, having a plurality of spaced-apart protrusions formed integral on one side thereof and positioned below said face within the casing, said apertures corresponding to said protrusions such that said protrusions project freely through said apertures, electrical contact means mounted within the casing biasing said simulated push-button member against the underside of said face, and an electrical circuit to be energized by a battery having signalling means incorporated therein in series with said electrical contact means such that depression of any of said protrusions closes said electrical contact means for energizing said signalling means and release of said protrusion opens said electrical contact means for de-energizing said signalling means.

2. In a telephone cradle as claimed in claim 1, a battery housing within said casing, said electrical contact biasing means comprising an arcuate arm mounted on said battery housing having one end projecting within said housing for making electrical contact with a battery therein and an arm portion abutting the simulated push-button member for biasing said push-button member against the underside of the cradle face, and the opposite end of said arm disposed freely in proximity to a fixed contact member such that depression of any of said protrusions displaces the free end of said arm against the fixed contact member to make electrical contact therewith.

3. In a telephone cradle as claimed in claim 2, said arcuate arm abutting a central portion of the simulated push-button member such that depression of any of the peripheral protrusions pivots the said simulated push-button member about its opposite edge.

4. In a telephone cradle as claimed in claim 2, said signalling means comprising a buzzer.

5. In a telephone cradle as claimed in claim 2, said signalling means comprising a buzzer, and a light mounted on said casing.

6. In a telephone cradle as claimed in claim 3, said signalling means comprising a buzzer.

7. In a telephone cradle as claimed in claim 3, said signalling means comprising a buzzer, and a light mounted on said casing.

8. In a telephone cradle as claimed in claim 5, said buzzer electrically connected in parallel with said light.

References Cited
UNITED STATES PATENTS 1,804,265  5/1931  Minick _____ 46—232 X ANTONIO F. GUIDA, Primary Examiner EDWARD KRAUSE, Assistant Examiner U.S. Cl. X.R.

46—227